United States Patent
Noirot

[11] 3,770,592
[45] Oct. 30, 1973

[54] DISTILLATION COLUMN
[75] Inventor: Marcel L. Noirot, Nemours, France
[73] Assignee: Societe de Verreries Industrielles Reunies Du Long, Levallois-Perret, France
[22] Filed: Apr. 27, 1971
[21] Appl. No.: 137,928

[30] Foreign Application Priority Data
Apr. 29, 1970 France .............................. 7015771

[52] U.S. Cl.................... 202/236, 159/6, 159/13 R, 203/89, 23/259
[51] Int. Cl........ B01d 3/08, B01d 3/00, B01d 1/22, B01b 3/00
[58] Field of Search...................... 159/5, 7, 8, 6 W, 159/6, 9 A, 11 A, 13 A; 202/81 L, 236; 203/DIG. 2, 89; 23/259

[56] References Cited
UNITED STATES PATENTS
2,006,513  7/1935   Rascher et al. ....................... 23/259
2,964,390  12/1960  Cummings ............................ 23/259
3,250,687  5/1966   Frank............................... 202/236 X
3,260,655  7/1966   McGee et al. .................. 202/236 X
3,292,683  12/1966  Buchi et al........................ 159/6 W
3,334,025  8/1967   Reid............................. 202/81 L X
3,372,095  3/1968   Nester............................... 202/153
3,505,023  4/1970   VanDamme...................... 23/259 X OTHER PUBLICATIONS
Cole Palmer, Instruments & Equipment Co., Chicago, Ill., Publication "Developments" Sept. 1960, pg. 9 April 1958, pg. 8

Primary Examiner—Norman Yudkoff
Assistant Examiner—G. J. Sofer
Attorney—Sughrue, Rothwell, Mion, Zinn & Macpeak

[57] ABSTRACT

In a cylindrical distillation column a central shaft is provided and a helical ribbon of flexible material is wound about the shaft and secured thereto to define a ramp having the desired pitch. The wound shaft is then inserted in the cylindrical column in fluid tight engagement therewith to provide a helical path for contact between the liquid phase and the vapor phase.

2 Claims, 2 Drawing Figures

DISTILLATION COLUMN

BACKGROUND OF THE INVENTION

1. Field of the Invention

This invention relates to a distillation apparatus with a helicoidal ramp supported by the central shaft of the column between the central shaft and the column.

2. Prior Art

Prior art distillation columns of the Dufton type are generally comprised of a cylindrical glass body in which there is placed a central glass shaft onto whose outside surface there is welded a glass rod which is hot-wound in spiral form. The outside diameter of the shaft-rod assembly is approximately equal to the inside diameter of the cylindrical body. The spiral is welded to the shaft whose ends themselves are welded to the cylindrical body, so that the entire assembly cannot be dismantled and so that a break in or damage to one of the pieces makes the column unusable.

SUMMARY OF THE INVENTION

According to this invention, the column is comprised of three elements, produced independently of each other and which are removable as well as interchangeable. These three elements are: a central shaft, a helicoidal packing defining a ramp with adjustable pitch and a cylindrical body, associated so as to make up a column whose efficiency may be adjusted by determining the pitch of the helicoidal packing during the assembly of the pieces.

The above features, as well as other secondary features and the resultant advantages will appear in a more detailed fashion in the specifications below, describing models given here by way of example and without any restrictions, referring to the attached drawing where:

DETAILED DESCRIPTION OF THE INVENTION

Figures 1, 2:
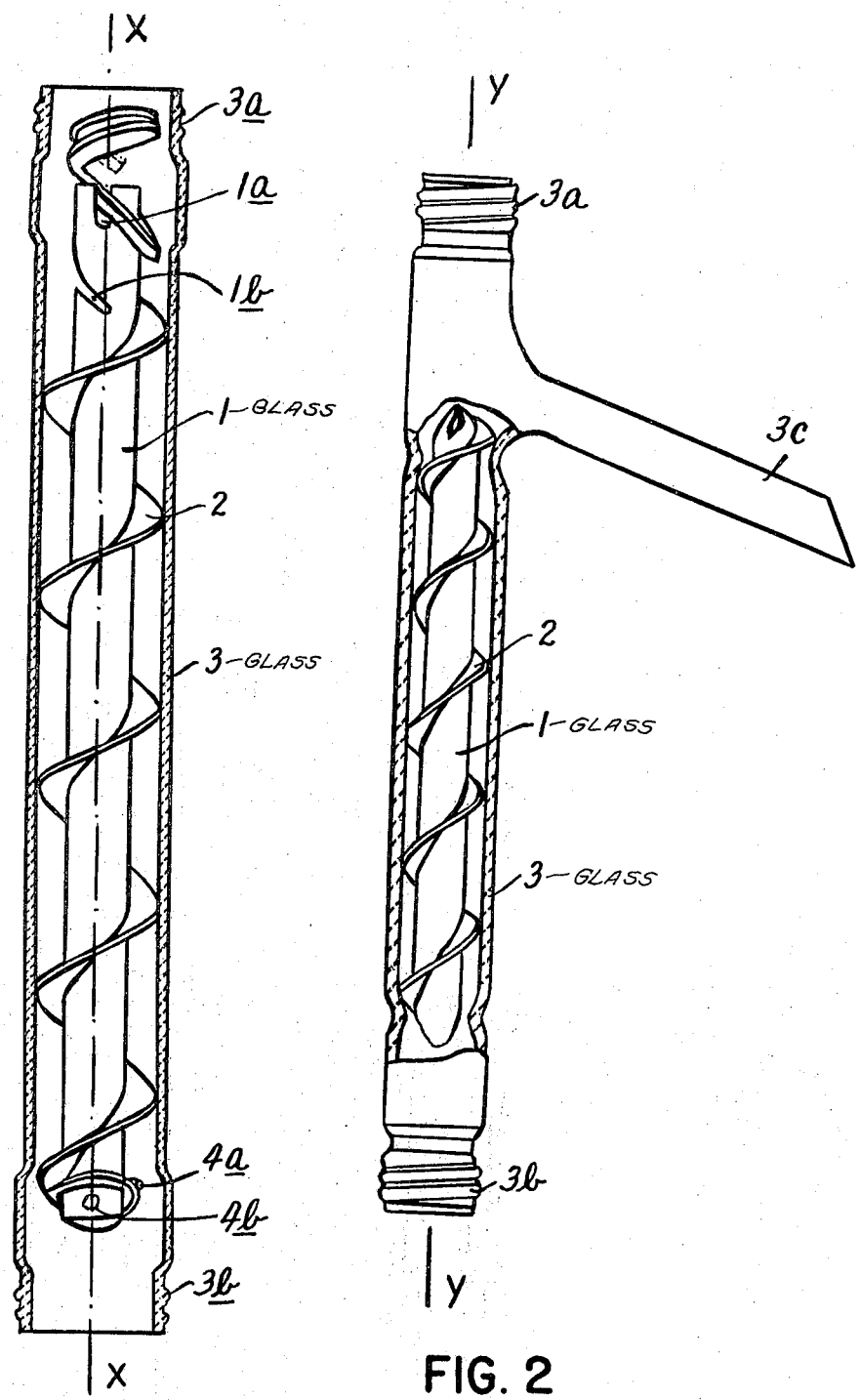
FIG. 1 shows the combination of the various elements making up a straight column.
FIG. 2 shows a distillation column with lateral tubulature, made according to this invention.

According to the principle of fractionated distillation, the constituents of a mixture $M_o$ of several liquids having different boiling points are separated by boiling the mixture and collecting on the one hand, the vapor $V_o$ produced (which is richer in more volatile bodies than the initial mixture) and, on the other hand, the remaining liquid $L_o$ (which is richer in less volatile bodies). By similarly treating, on the one hand, the liquid $L_1$, obtained by condensation of vapor $V_o$ and, on the other hand, the liquid $L_o$ and by repeating these two chains of operations $n$ times, it is possible to obtain in the end a vapor that practically contains only the most volatile product. This process is performed in columns called plate columns.

These operations can be conducted parallel and continuously, so that the vapor produced at the bottom of the column is, during its entire rise in the column, in intimate contact with the liquid that descends in a countercurrent and that comes from the condensation of the vapor situated at the head. In the course of these contacts between the liquid and the vapor, there are continuous heat and chemical exchanges which lead to the enrichment of the head vapors and the tail liquid, respectively, in terms of the more volatile constituent and in terms of the less volatile constituent. The column is considered all the more efficient, the more complete and the more rapid the separation is.

The following efficiency criteria are essential:

a. Uniformity and size of liquid-vapor contact surfaces;

b. Volume left for the vapor during its rise in the column, parallel to the evolution of the liquid downward;

c. Total quantity of liquid plus vapor, contained in the column at each instant.

It is generally necessary to make the contact surfaces as large and as uniform as possible, to leave the vapor sufficient space to permit its rise and to have only a small quantity of the product in the column at any moment in order to limit as much as possible the final mixture in terms of residue which cannot be separated into the two basic components of the initial mixture.

In the distillation column described above, the liquid coming from the top of the column is forced to follow a descending helicoidal coidal path while the vapor follows a similar ascending track along the entire length of which the vapor is in contact with the liquid. The above mentioned heated and chemical changes take place in the course of these movements of matter in the opposite directions.

Thus, the geometry of the helicoidal packing defines the contact surface between the liquid and the vapor (upper surface of this packing). For a given column height, the surface will be all the greater, the smaller the pitch of the helix. By virtue of the very structure of the helix at any point in the column, the contact surface is the same. The volume provided for the vapor is large and it is all the larger the greater the pitch of the helix.

The quantity of mixture introduced into a column may be made very small. In practice it may be limited to the covering of the entire helicoidal surface of the ramp and to the edge effects resulting from surface tension.

The criteria (a) and (b) each require a different optimum pitch for the helix, which forces the selection of a compromise value. Unfortunately, this optimum average value from one mixture to the next, whereas the structure of the column according to the conventional structure previously known, has no flexibility in this respect, since its parameters are fixed once and for all during the assembly and installation of the column by the combining of its three components into one solid piece.

On the other hand, according to the device in FIG. 1, it is possible to use the same column for different mixtures by varying the helix parameter. In the column according to the invention, a central shaft 1, a helicoidal packing 2, and a glass body 3 threaded on the outside at its two ends 3a and 3b to permit its junction to the supply and extraction tubes are adjustably assembled. The central shaft 1 may be made of glass, polytetrafluoroethylene (PTFE) or any other chemically inert substance. It is slotted at one of its ends, to provide cuts, 1a and 1b, in order to receive one of the ends of the helicoidal packing 2, obtained by drawing a spiral spring made of PTFE, for example. The inside diameter of the spirals corresponds to the outside diameter of the central shaft and where the outside diameter of the spirals corresponds to the inside diameter of the column body. A removable clip is provided at the other end of this central shaft to lock the spiral. In the example shown in FIG. 1, it is made up of a couple of pins 4a and 4b which lock a cylindrical ring, which comes in one piece with the helicoidal packing, in a predetermined position.

The advantages of such a structure are rapid assembly and disassembly, easy cleaning of components, easy replacement of any of the pieces in case of deterioration or modification of helix pitch as desired (in other words modification of volume offered to the vapor between two contiguous turns).

It must also be noted that contact between the three components is made considerably more precise and more sure, which permits excellent tightness between two contiguous turns, hence, uniform efficiency of the column over its entire height.

The helicoidal packing used may be very thin thereby assuring a maximum volume for the circulation of the liquid and vapor phases. Since it is flat, it constitutes a slope on which the spread of the liquid is uniform, with an edge effect reduced to a minimum, thus using the smallest quantity of liquid possible.

Since the helicoidal packing is flexible and since the clips provided on the central shaft are removable, one can vary the pitch of the screw by using a larger or smaller number of turns of the helicoidal packing. Since it has been indicated that the pitch has an inverse influence on the first two parameters of the column, we can see that one can select the most favorable pitch as a function of the mixture to be treated and of the result to be obtained.

FIG. 2 illustrates a similar device, involving a rod 1 and a helicoidal ramp 2, attached to the rod 1 at its two ends. The entire assembly is kept in place in body 3 of the distillation column in the same manner as before (not shown in FIG. 2 for reasons of greater clarity. It is furthermore provided with a lateral derivation tube 3c.

Although this invention has been illustrated by means of two preferred models, it is obvious that one can make detailed modifications in it without going beyond the framework of the invention.

I claim:

1. A distillation column comprising a hollow cylindrical column, a shaft non-rotatably, removably and concentrically disposed in said column, a thin, removable & replacable helicoidal resilient packing strip wrapped about said shaft in fluid tight engagement with said shaft and said column and means for detachably securing said packing strip to said shaft at opposite ends thereof whereby said packing strip may be disposed in contact with said shaft and said cylindrical column and the packing strip is selected so that its pitch is suited to the material being distilled and its diameters to engage said shaft and column.

2. A distillation column as set forth in claim 1 wherein said means for securing said packing strip is comprised of a slot in one end of said shaft along the axis thereof for securing one end of said packing strip, clip means for securing the other end of said packing strip to the other end of said shaft, said other end of said packing strip being provided with ring means for cooperating with said clip means.

* * * * *